Figure 1:
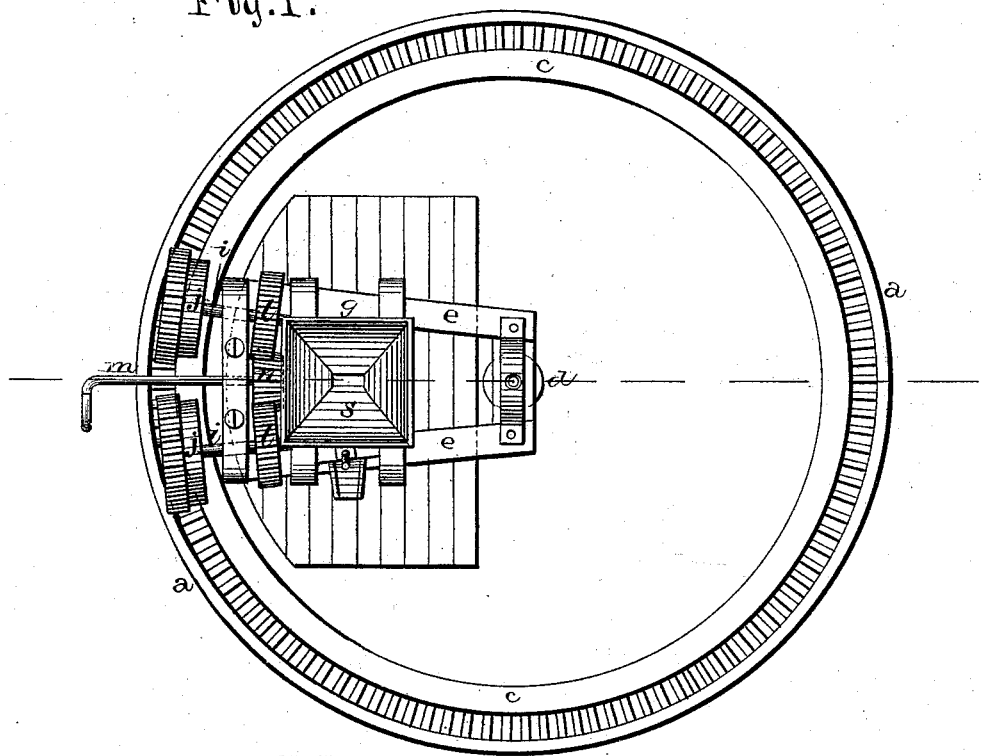
Figure 2:
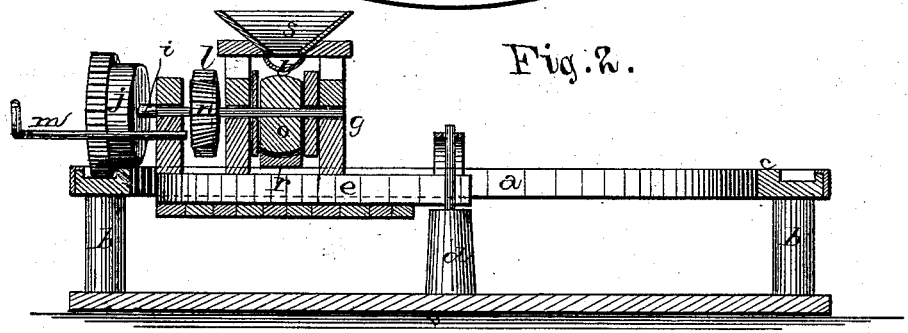
Figure 3:
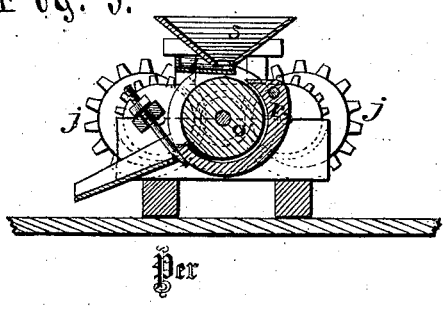

W. C. PITTS.
Horse-Power Mill.

No. 203,292. Patented May 7, 1878.

Witnesses:
J. V. Garner
H. S. D. Haines

Inventor:
Wm. C. Pitts
per
J. A. Lehmann
Attorney

UNITED STATES PATENT OFFICE.

WILLIAM C. PITTS, OF SAN MARCOS, TEXAS, ASSIGNOR OF ONE-HALF HIS RIGHT TO J. H. BISHOP, OF SAME PLACE.

IMPROVEMENT IN HORSE-POWER MILLS.

Specification forming part of Letters Patent No. 203,292, dated May 7, 1878; application filed March 28, 1878.

*To all whom it may concern:*

Be it known that I, WILLIAM C. PITTS, of San Marcos, in the county of Hays and State of Texas, have invented certain new and useful Improvements in Horse-Power Mills; and I do hereby declare the following to be a full, clear, and exact description of the invention, such as will enable others skilled in the art to make and use it, reference being had to the accompanying drawings, which form part of this specification.

My invention relates to an improvement in combined grinding-mill and horse-power; and it consists in pivoting one end of the mill upon a standard and supporting the other end upon a circular rack, and attaching the horse directly to the mill, outside of the rack, so that as he moves around the edge of the rack, as in a common horse-power, he will carry the mill around with him and cause it to operate, as will be more fully described hereinafter.

The accompanying drawings represent my invention.

*a* represents a circular track, supported at any suitable distance above the ground upon the posts *b*, and which may be of any diameter preferred. The top of this rack is provided with a row of cogs, which run around its entire outer edge, and inside of this row of cogs is a smooth bearing-surface, *c*. In the center of the ring formed by the rack is a post or standard, *d*, upon the top of which one end of the frame *e* is pivoted. This frame is made sufficiently long to reach from the pivot on top of the post to the inside of the circular rack, as shown, and upon its top is placed a grinding-mill, *g*. Passing through the outer end of this frame *e* are the two shafts *i*, upon the outer ends of which shafts are placed the supporting and driving wheels *j*. Each one of these wheels has its surface formed of cogs or teeth to fit in the circular row of cogs on the track *a*, and the smooth bearing to rest upon the smooth bearing-surface *c* of the rack. Each one of these shafts *i* has a cog-wheel, *l*, upon its inner end, and each one of these cog-wheels gears with and operates the pinion *n*, placed between them.

Projecting outward from the frame *e*, beyond the circular rack, is a rod or lever, *m*, to which the horse is hitched for the purpose of drawing the frame *e*, supported as above described, around upon the inside of the rack, and carrying the grinding-mill *g* with it. As the horse draws the frame around, the two wheels *j*, meshing with the cogs upon the top of the circular track *a*, both exert their full power upon the pinion placed between them; and as this pinion is placed upon the shaft upon which the stone or other grinding device *o* is secured, it will be seen that the motion of the horse around the rack sets the mill into operation. This mill consists of the round stone *o* and the concave portion *p*, above which is placed the hopper *s* and spout *t*.

If preferred, there may be a trough placed around the inside of the track *a*, so that as the mill moves around the meal or flour will be deposited in this trough; or a receptacle to receive the flour or meal may be attached directly to the frame *e*, and be carried around with the mill.

By thus combining a horse-power directly with the mill, it will readily be seen that the expense of a separate machine to receive the power of the horse and then transmit it to the mill is entirely done away with, and that the horse is here connected directly with the mill itself.

As the mill is supported at its inner end by the post or standard, and at its outer end by the wheels *j* upon the track *a*, it is evident that much less power will have to be exerted by the horse to carry the mill around and to operate it at the same time than to operate a separate machine and then transfer the power to the mill.

I am aware that a mill pivoted at its center and drawn around by a horse is old, as shown in the patent to J. M. Westmoreland, November 15, 1870.

My invention consists in providing the track and wheels with both smooth and cogged surfaces, so that the wheels cannot slip, and the whole force of the two wheels *j* be concentrated upon the mill.

Having thus described my invention, I claim—

The track *a*, having both a cogged and a smooth surface, *c*, in combination with the wheels *j*, having corresponding surfaces, shafts *i*, wheels *l*, pinion *n*, and mill *o r*, the mill being supported at its inner end upon a pivot, substantially as shown and described.

In testimony that I claim the foregoing I have hereunto set my hand this 9th day of March, 1878.

WILLIAM CURTIS PITTS.

Witnesses:
JAMES W. SCOTT,
J. W. HORTON.